United States Patent [19]

Sipilä et al.

[11] Patent Number: 4,899,891
[45] Date of Patent: Feb. 13, 1990

[54] METHOD OF AND STORAGE RACK FOR STORING GLASS SHEETS

[75] Inventors: Eero S. K. Sipilä ; Erkki P. J. Yli-Vakkuri, both of Tampere, Finland

[73] Assignee: Tamglass Oy, Tampere, Finland

[21] Appl. No.: 214,403

[22] Filed: Jul. 1, 1988

[30] Foreign Application Priority Data

Aug. 25, 1987 [FI] Finland .................................. 873663

[51] Int. Cl.$^4$ ............................................. A47F 7/00
[52] U.S. Cl. ..................................... 211/41; 206/448
[58] Field of Search .................. 211/41; 206/448, 449, 206/454, 455

[56] References Cited

U.S. PATENT DOCUMENTS

| | | | |
|---|---|---|---|
| 3,147,860 | 9/1964 | Kean et al. | 206/448 |
| 4,368,822 | 1/1983 | Kramer et al. | 206/448 X |
| 4,489,835 | 12/1984 | Tombal et al. | 206/448 X |
| 4,512,473 | 4/1985 | Thomaswick | 206/448 X |
| 4,733,781 | 3/1988 | Gerlach | 206/448 X |

Primary Examiner—Robert W. Gibson, Jr.
Attorney, Agent, or Firm—Burns, Doane, Swecker & Mathis

[57] ABSTRACT

The invention relates to a method of and a storage rack for storing glass sheets in a substantially upright position spaced at a small distance from each other. Intermediate supports (2), together with a lever arm (4), form a bell crank whose angular point is linked to a carrier beam (8) by means of a pivot (9). The free end of each lever (4) carries a roller or a sliding surface (5), positioned at a location between intermediate supports (2). As the glass sheets are placed on the rack in a manner that the lower edge of glass sheet (7) is set upon rollers (5), the dead weight of a glass sheet lifts up the intermediate supports (2) for separating the glass sheets from each other.

14 Claims, 3 Drawing Sheets

METHOD OF AND STORAGE RACK FOR STORING GLASS SHEETS

The present invention relates to a method of storing glass sheets in a substantially upright position spaced a small distance from each other, wherein intermediate supports are lifted up to separate glass sheets from each other as the glass sheets are being set on a storage rack.

The invention relates also to a storage rack for carrying out the method of claim 1, said storage rack comprising a framework having carrier beams for bearing the glass sheets upon their edges as well as ascendable and descendable intermediate supports which in their uplifted position hold the glass sheets in a substantially upright position and spaced from each other.

It is prior known to employ separate pieces or spokes as intermediate supports, placed between the glass sheets as the sheets are being loaded on a storage rack. It is also known to employ such intermediate supports which are pivotably journalled to a rack and pivotable from a lower position to an upper position as the glass sheets are being loaded.

A drawback in both prior known solutions is that they cannot be applied to automatic loading.

In one prior art storage rack the intermediate supports are fixed and preset in an upright position. Even in this case, automatization is complicated and expensive to set up since the glass sheets must be slipped from above in between the fixed intermediate supports.

An object of the invention is to provide an improved method of and a storage rack for storing glass sheets in a manner that automatization of the loading of glass sheets in a fashion essentially more simple than before.

This object is achieved by the invention on the basis of the characterizing features set forth in the annexed claims.

One preferred embodiment of the invention will now be described with reference made to the accompanying drawings, in which FIG. 1 is a perspective view of a storage rack of the invention in a partially loaded condition.

Figure 1:
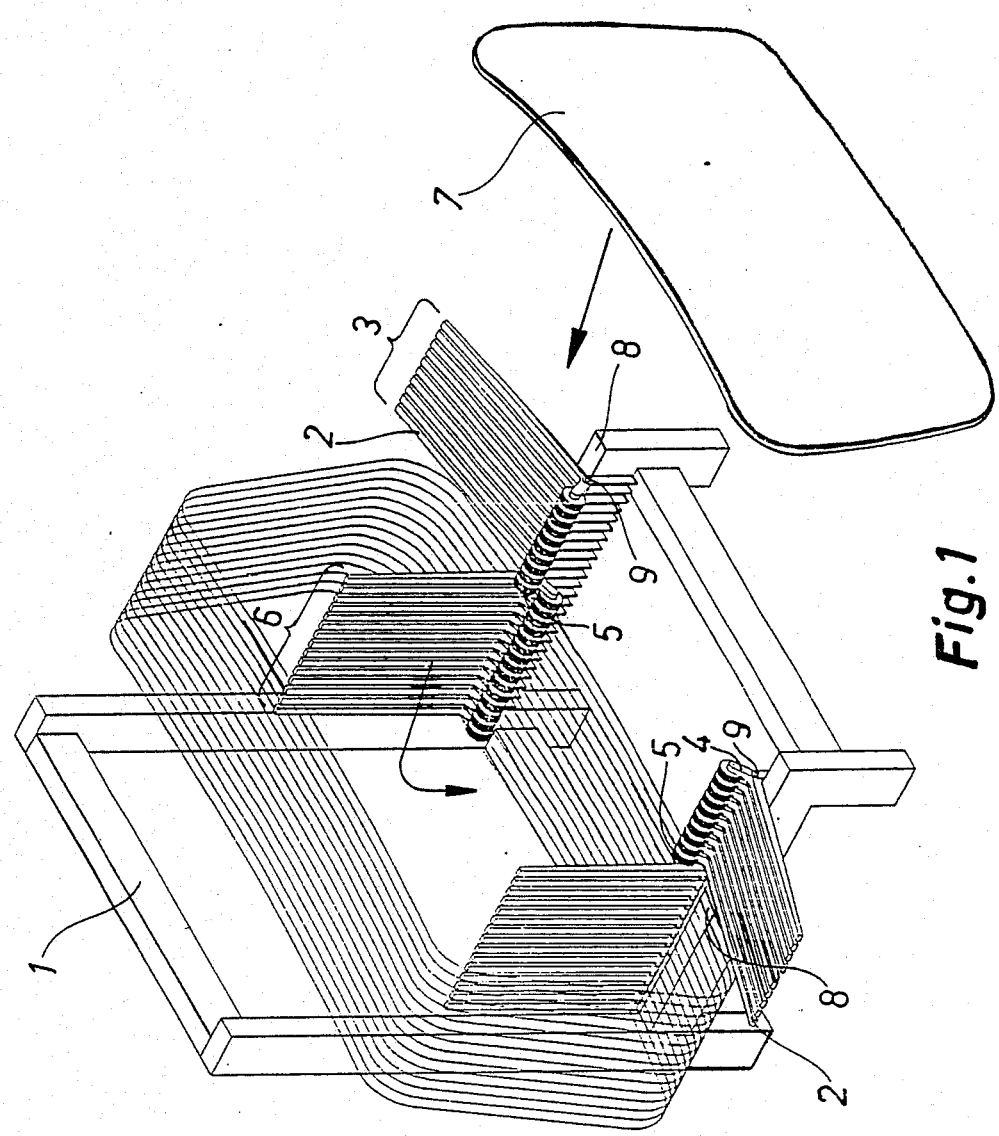
Figure 2:
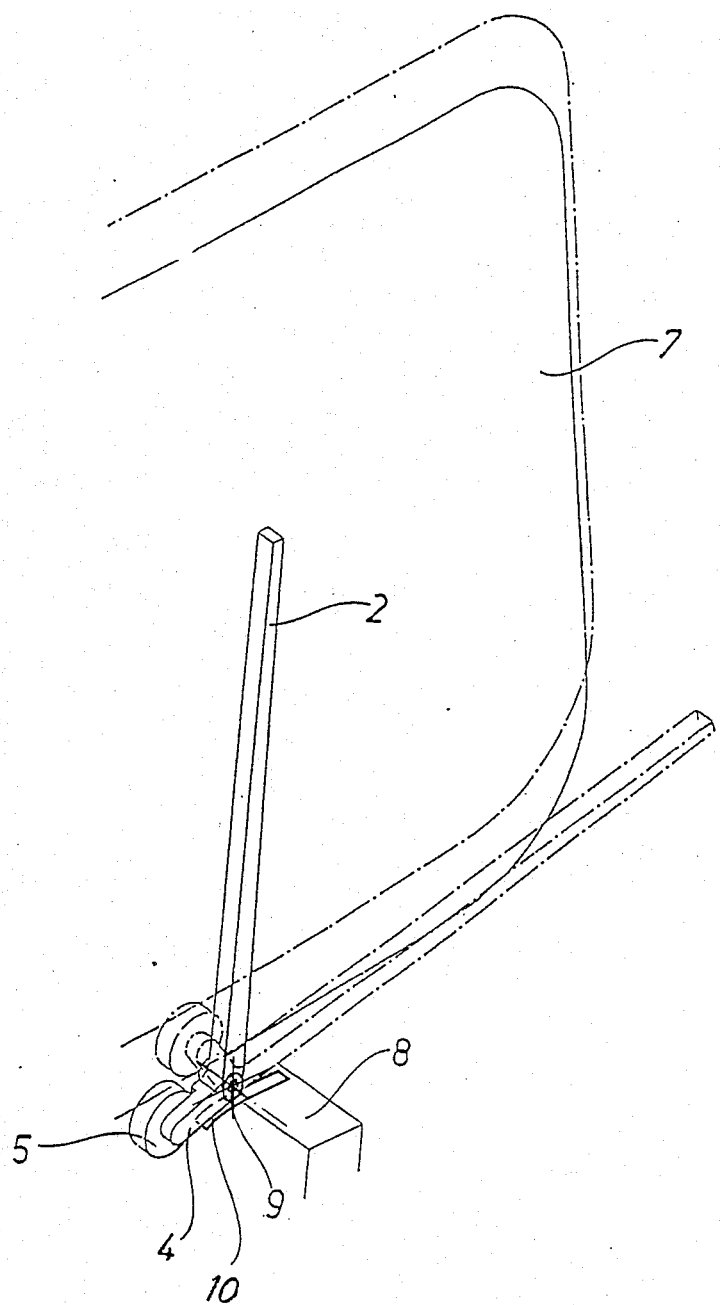
FIG. 2 shows a detail of a storage rack in a perspective view.
Figure 3:
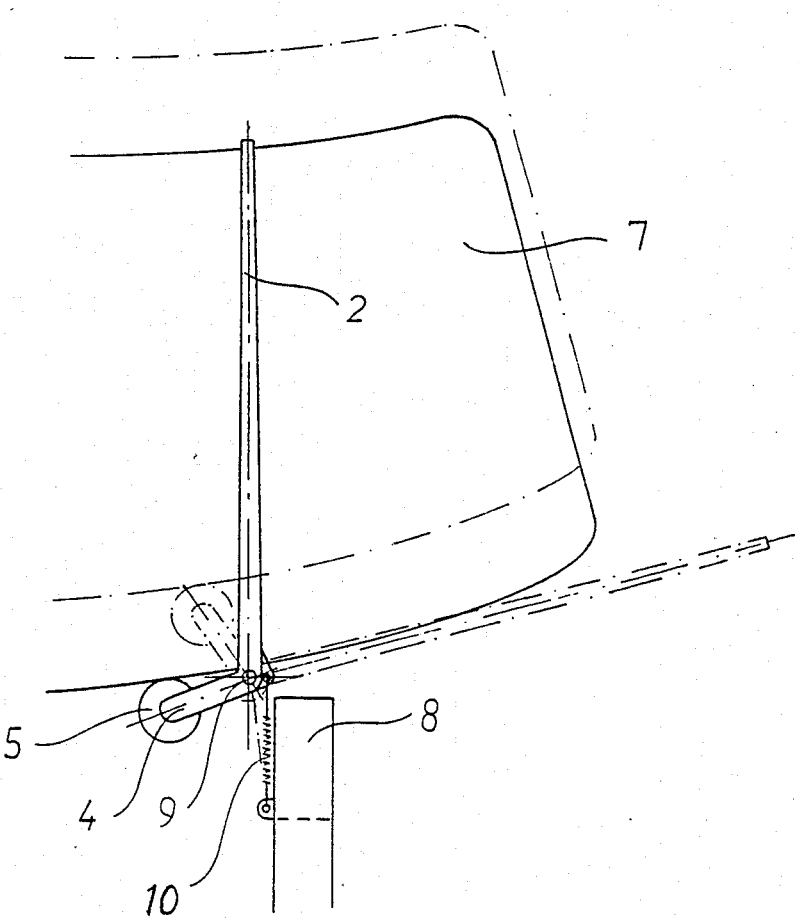
FIG. 3 shows the same detail as FIG. 2 but fitted with a different return spring 10.

The storage rack comprises a framework 1 provided with horizontal, spaced-apart carrier beams 8 upon which the lower edges of glass sheets are placed and which serve as bearers for the glass sheets. Intermediate supports 2 are journalled with a pivot 9 so as to be pivotable between a lowered position (section 3) and an uplifted position (section 6). In their lowered position said intermediate supports 2 lie nearly in a horizontal position and in an uplifted position substantially in a vertical position.

A novel feature in the invention is that intermediate supports 2 are adapted to be lifted up by the own weight of glass sheets 7 as said glass sheets 7 are being loaded. For this reason, in the present embodiment, the base of each intermediate support 2 is fitted with a lever arm 4 which, together with the intermediate support, forms a bell crank, said pivot 9 being positioned at the angular point thereof. The free end of lever arm 4 is provided with a roller 5 which is rotatable around an axle stub. Roller 5 is positioned alongside said lever arm 4 and, thus, each roller 5 will be located between two successive intermediate supports 2.

In the unloaded condition, the intermediate supports 2 are directed away from each other beyond carrier beams 8 and lever arms 4 are directed within the area between carrier beams 8 towards each other obliquely upwards. Thus, rollers 5 will be located slightly above the bearing level provided by the top surfaces of carrier beams 8 while leaving, however, the loading space above carrier beams 8 essentially vacant.

A glass sheet 7 can be brought to the storage rack either in horizontal or vertical direction. At the start of a loading operation, the lower edge of the first glass sheet is set upon the rollers 5 carried by the first row intermediate supports 2. As the glass sheet is lowered vertically down, the dead weight of such glass sheet causes the intermediate supports 2 to turn automatically up in front of said glass sheet so as to separate the glass sheet from the next one. The glass sheet remains resting on its lower edge upon the carrier beams 8. The storage rack can be fully loaded in this fashion.

A storage rack of the invention is suitable for both manual and automatic loading and unloading. The rack is suitable for both straight and curved glass sheets. The rack can be loaded directly from out front, nor need the intermediate supports be separately set up or pivoted to their position to separate the glass sheets from each other.

The intermediate support 2 and lever arm 4 can be made e.g. of plastics or aluminium in a single piece. Each intermediate support 2 can be adapted to returned by a spring 10 from an uplifted position to a lowered position as glass sheets are being removed from the storage rack. A spring return is more preferred than gravitational return since the former provides more pull-back force and intermediate supports 2 can be designed with other aspects in mind regardless of the centre of gravity.

It is quite obvious that the invention is not limited to the above embodiment but the lifting of intermediate supports 2 by means of the weight of glass sheets 7 can be effected with most different mechanical ratios.

We claim:

1. A storage rack for glass sheets comprising:
   a framework having at least two carrier beams for bearing glass sheets and a plurality of intermediate supports for holding glass sheets in a substantially equally spaced, upright position on said at least two carrier beams, said plurality of intermediate supports being mounted on said at least two carrier beams;
   a plurality of means for lifting said plurality of intermediate supports according to the weight of said glass sheets so as to hold said glass sheets in a substantially equally spaced, upright position, each of said plurality of means for lifting being disposed below the edges of said glass sheets.

2. A storage rack as set forth in claim 1, wherein each of said plurality of means for lifting is linked to one of said plurality of intermediate supports by one of a plurality of lever arms.

3. A storage rack as set forth in claim 2, wherein each of said means for lifting includes a bell crank formed from one of said plurality of intermediate supports and one of said plurality of lever arms, said bell crank being pivotably journalled around a pivot, said pivot located substantially at a connecting point of one of said plurality of intermediate supports and one of said plurality of lever arms, said one of said plurality of intermediate supports having a length greater than a length of one of said plurality of lever arms.

4. A storage rack as set forth in claim 2, wherein each of said means for lifting includes at least one of a roller and a sliding surface disposed on a free end of each of said plurality of lever arms, said at least one of a roller and a sliding surface serving to support a lower edge of a glass sheet.

5. A storage rack as set forth in claim 1, said storage rack further comprising a a plurality of springs, each of said plurality of springs serving to return each of said plurality of intermediate supports from an uplifted position to a lowered position as the weight of said glass sheets is removed from the storage rack.

6. A storage rack as set forth in claim 2, wherein each of said plurality of intermediate supports is integral with a corresponding lever arm to form a single piece, said single piece comprised of at least one of plastic and aluminum.

7. A storage rack as set forth in claim 2, wherein each of said plurality of intermediate supports is at least five times greater in length than each of said plurality of lever arms.

8. A storage rack as set forth in claim 2, wherein a first set of said plurality of intermediate supports is disposed on a first carrier beam of said at least two carrier beams and a second set of said plurality of intermediate supports is disposed on a second carrier beam of said at least two carrier beams, said first and second carrier beams being arranged parallel to each other, said first and second set of said plurality of intermediate supports being directed oppositely away from each other when said storage rack is unloaded so as to extend beyond said first and second carrier beams, respectively, said plurality of lever arms being opposite each other between said first and second carrier beams, said plurality of lever arms being directed obliquely upwards when said storage rack is unloaded.

9. A storage rack as set forth in claim 3, wherein each of said means for lifting further includes at least one of a roller and a sliding surface disposed on a free end of each of said plurality of lever arms, said at least one of a roller and a sliding surface serving to support a lower edge of a glass sheet.

10. A storage rack as set forth in claim 3, wherein each of said plurality of intermediate supports is integral with a corresponding lever arm so as to form a single piece, said single piece comprised of at least one of plastic and aluminum.

11. A storage rack as set forth in claim 3, wherein each of said plurality of intermediate supports is at least five times greater in length than each of said plurality of lever arms.

12. A storage rack as set forth in claim 3, wherein a first set of said plurality of intermediate supports is disposed on a first carrier beam of said at least two carrier beams and a second set of said plurality of intermediate supports is disposed on a second carrier beam of said at least two carrier beams, said first and second carrier beams being arranged parallel to each other, said first and second set of said plurality of intermediate supports being directed oppositely away from each other when said storage rack is unloaded so as to extend beyond said first and second carrier beams, respectively, said plurality of lever arms being opposite each other between said first and second carrier beams, said plurality of lever arms being directed obliquely upwards when said storage rack is unloaded.

13. A method of storing glass sheets in a substantially equally spaced, upright position comprising the steps of:
setting glass sheets on a storage rack in a sequential manner;
lifting intermediate supports so as to separate each sequentially placed glass sheet, said lifting performed in response to the weight of each glass sheet being placed onto the storage rack.

14. A method for storing glass sheets as set forth in claim 13, further comprising the steps of:
removing said glass sheets from the storage rack in a sequential manner; and
returning the intermediate arms from a lifted position to a lowered position.

* * * * *